J. M. SANDERS.
BATTER DROPPER.
APPLICATION FILED JUNE 20, 1913.
1,144,918.
Patented June 29, 1915.
4 SHEETS—SHEET 1.
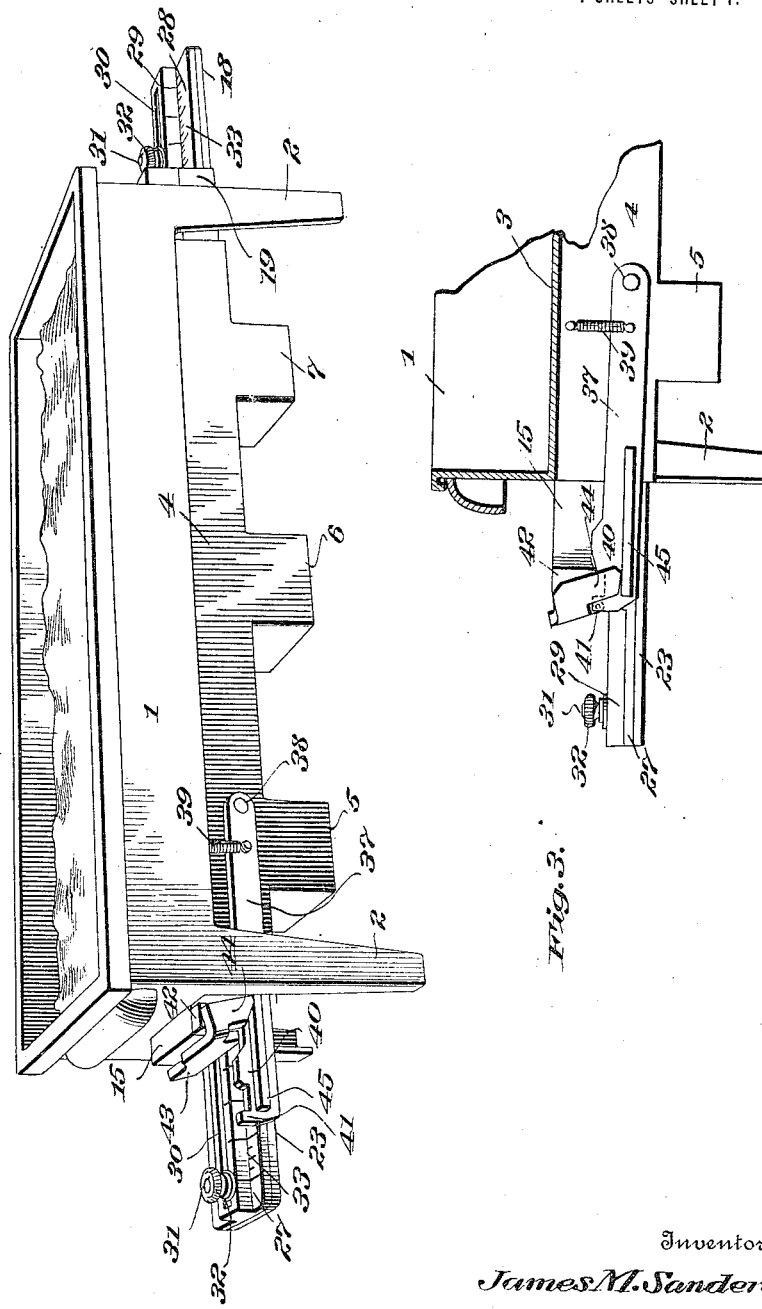
Witnesses
J. C. Hennesy
D. W. Gould
Inventor
James M. Sanders,
By Victor J. Evans
Attorney J. M. SANDERS.
BATTER DROPPER.
APPLICATION FILED JUNE 20, 1913.
1,144,918.
Patented June 29, 1915.
4 SHEETS—SHEET 2.
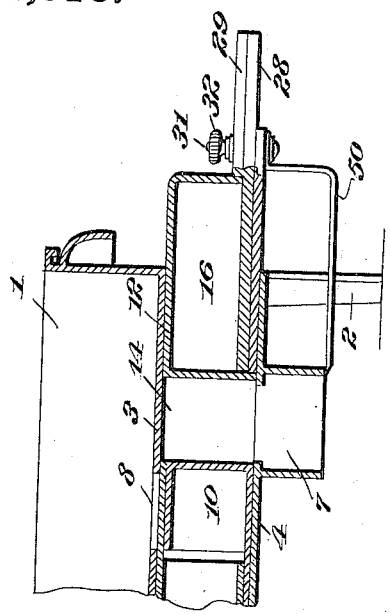
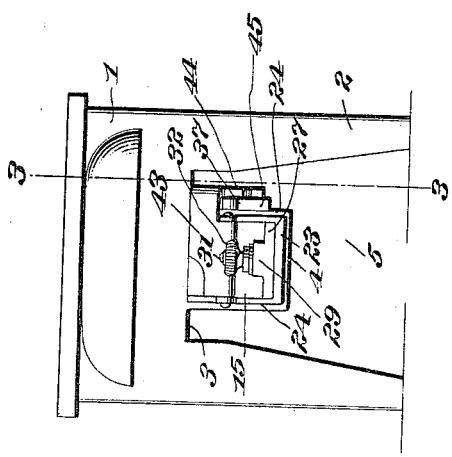
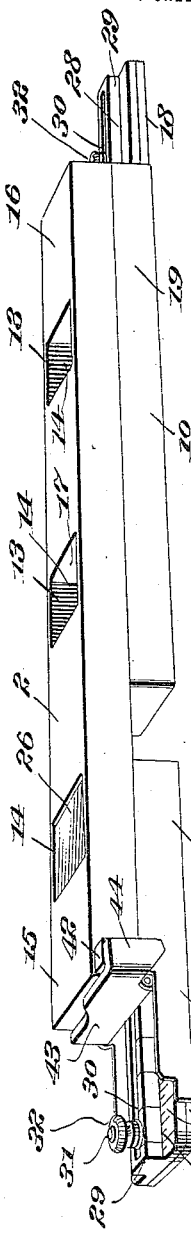
Witnesses
J. C. Hennesy
D. W. Gould.
Inventor
James M. Sanders,
By Victor J. Evans
Attorney J. M. SANDERS.
BATTER DROPPER.
APPLICATION FILED JUNE 20, 1913.
1,144,918.
Patented June 29, 1915.
4 SHEETS—SHEET 3.
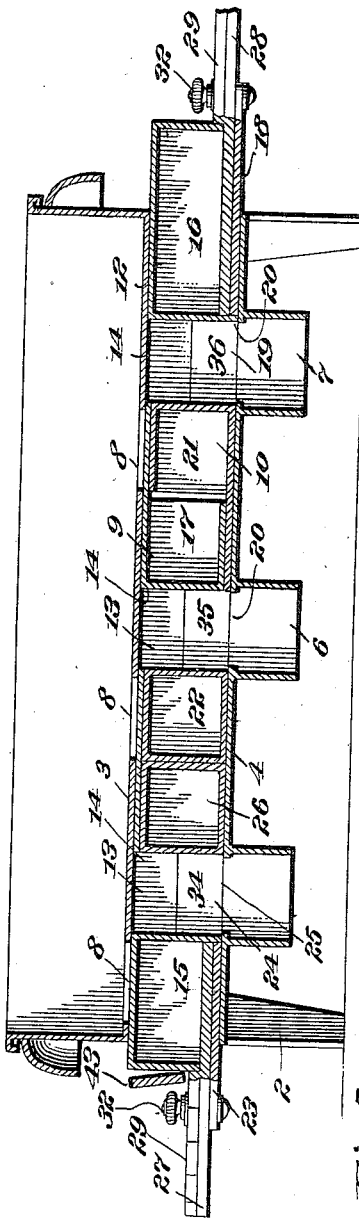
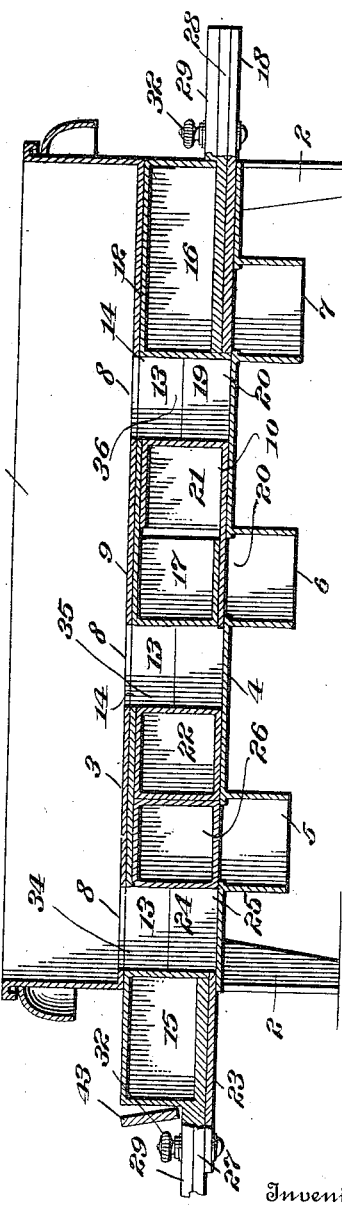
Witnesses
G. C. Hemey
D. W. Gould.
Inventor
James M. Sanders
By Victor J. Evans
Attorney

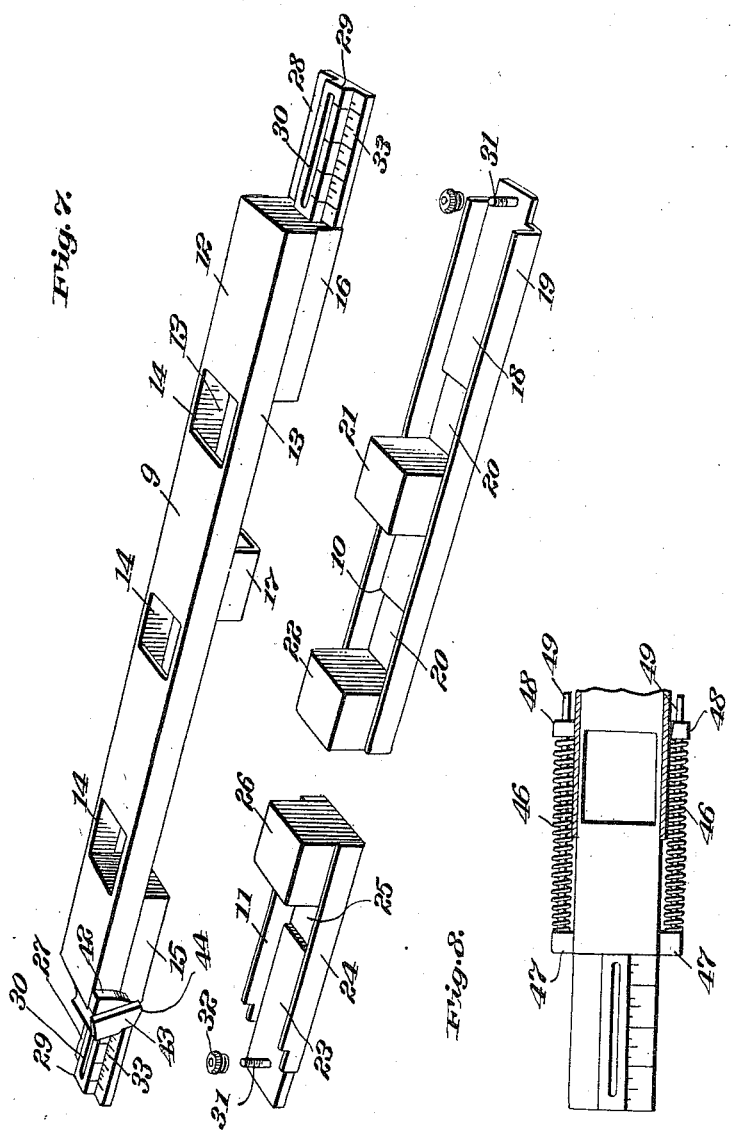

UNITED STATES PATENT OFFICE.

JAMES M. SANDERS, OF ST. LOUIS, MISSOURI.

BATTER-DROPPER.

1,144,918.

Specification of Letters Patent. Patented June 29, 1915.

Application filed June 20, 1913. Serial No. 774,831.

*To all whom it may concern:*

Be it known that I, JAMES M. SANDERS, a citizen of the United States, residing at St. Louis, in the State of Missouri, have invented new and useful Improvements in Batter-Droppers, of which the following is a specification.

The invention relates to an improvement in batter droppers designed particularly for providing a means whereby a predetermined amount of batter may be readily and conveniently delivered on to the surface of the griddle or other cooking implement.

The main object of the present invention is the provision of a batter dropper including a receptacle in which the batter is placed in bulk and from which it is delivered, controlled in predetermined quantity by a manually operable slide member, whereby the operator may deliver to the cooking implement one or more separate quantities of batter, the particular quantity in each delivery being controllable at the will of the operator.

The invention in its preferred form of details will be described in the following specification, reference being had particularly to the accompanying drawings, in which:—

Figure 1 is a perspective view illustrating the improved batter dropper. Fig. 2 is an end elevation of the same. Fig. 3 is a broken elevation partly in section of the end of the same. Fig. 4 is a vertical section with the parts shown in position to deliver batter to the cooking implement. Fig. 5 is a similar view with the parts in position to receive the batter from the receptacle for delivery. Fig. 6 is a perspective view of the controlling slide. Fig. 7 is a perspective view showing the parts of the slide separated. Fig. 8 is a broken plan partly in section showing a modified operating means. Fig. 9 is a broken sectional view illustrating particularly the guide spout cleaner.

Referring particularly to the accompanying drawings, the improved batter dropper includes a receptacle 1 in which, as will later appear, the ingredients making up the batter may be mixed and from which batter may be delivered to the cooking utensil as desired. This receptacle is preferably of rectangular type and may if desired, be supported on legs 2. Beneath the bottom 3 of the receptacle is a rectangular casing 4 carried by the bottom wall of which are a plurality (in this instance three) batter chutes 5, 6 and 7. These chutes are in open communication with the case and with the receptacle through openings 8 in the bottom wall of the latter, said openings being relatively offset from direct alinement with the batter chutes.

Mounted for longitudinal sliding movement in the casing 4 is what I term a control member comprising a main member 9 and coöperating adjusting members 10 and 11. The main member comprises a rectangular plate 12 having edge flanges 13, the plate being formed with openings 14 corresponding in size and shape to the openings 8 in the bottom of the batter receptacle, the openings 14 being relatively disposed so as to simultaneously register with the respective openings 14. Secured between the flanges 13 of the main member are blocks 15 and 16, arranged at respective ends of the member, the former being secured at one end of the member with its relatively inner edge in alinement with one edge of the immediately adjacent opening 14, the latter block being arranged at the opposite end of the member with relatively inner edge in alinement with the immediately adjacent opening 14. Another block 17 is secured between the flanges with one edge adjacent the intermediate opening 14. These blocks which operate as and will be hereinafter termed cut off blocks, are of such size and so positioned that when the control element is moved to register the openings 14 thereof with the openings 8 in the bottom of the receptacle, the blocks 16 and 17 will respectively close and cut off the adjacent batter chutes 7.

An adjusting member 10 comprises the plate 18 having upstanding edge flanges 19, and formed with openings 20 to register with the batter chutes 6 and 7 in the movement of the control member. The blocks 16 and 17 of the main member project below the edge flanges 13 of said member and thus provide a bearing for the edge flanges 19 of the adjusting member 10, it being understood that when assembled the adjusting member is arranged beneath the main member. Beyond the respective openings 20 of the adjusting member, considered from the connected end of the device, as later described, the plate 18 is provided with blocks 21, 22, the latter being at the relatively inner end of the adjusting member. The adjusting member 11 comprises a plate 23 having upturned edge flanges 24 to slidably coöperate with the edge of the block 15 of the main member, said plate being formed with an opening 25 to register with an opening 14 of the main member, the block 26 being secured to the plate immediately beyond said opening 25.

The blocks 15 and 16 of the main members are provided with extension plates 27, 28 formed with longitudinally disposed ribs 29 in which and in the plate are formed longitudinally extending slots 30. The plates 18 and 23 of the adjusting members are of such length that when the latter members are in coöperative relation to the main member, said plates will underlie the extension plates 27 and 28, said plates 18 and 23 being provided with upstanding threaded rods 31 designed to be passed through the slots 30 and to be engaged therebeyond by locking members or nuts 32. Extension plates may if desired be provided with scales 33 whereby the adjusting may be controlled.

When assembled in normal position a control member is of a size and shape to slidably fit in the casing 4, and said control member, through the blocks 15 and 26 provides a throat 34 which registers with the openings 14 and 25; the blocks 32 and 17 provide a throat 35 which registers with the opening 14 and the space between the relatively inner ends of the adjusting member; while the blocks 16 and 21 provide a throat 36 which registers with the openings 14 and 20.

To insure proper registry of the throats 34, 35 and 36 with the batter chutes 5, 6 and 7 in the delivery operation of the structure, I provide a locking means which will stop the control member in the delivery movement in accurate position. This locking means includes a lever 37 pivotally connected at 38 to the casing 4 and normally held under an upward pull by a spring 39. The free end of the lever projects toward one end of the structure extending beyond the batter receptacle being provided adjacent its end with an upstanding lug 40 and at the end with a terminal lug 41. Secured upon the control member is an abutment 42, the lower end of which is in position to be engaged by either lugs 40 or 41, the latter serving as a stop lug and the former as a trip lug, being for this function provided with inclined end edges as shown. Pivotally mounted on the control member is a finger operated trip 43, that portion overlying the lever being provided with a finger 44 designed to engage and coöperate with the offset ledge or flange 45 carried by the lever, the parts being so arranged that upon the tilting of the trip so that its upper portion contacts with the control member, the finger 44 will engage the flange 45 and depress the lever 37 beyond the operative end of the abutment 42. The various parts described are so positioned that when the abutment 42 is between the stop lug 41 and the trip lug 40, as shown in Fig. 3, the respective throats 34, 35 and 36 will be accurately alined with the batter chutes 5, 6 and 7 as shown in Fig. 4.

As shown in Fig. 8, I contemplate the use of other than the described locking means for governing the control member, in this instance arranged coil springs 46 between abutments 47 on the control member and the abutment 48 on the casing 4, the abutments 47 being provided with rods 49 which slidably coöperate with the abutments 48 and serve to prevent deflection of the springs. In this form, it will be obvious that pressure upon the control member serves to compress the springs 46, and that release of such pressure will automatically restore control member to normal or inoperative position.

If desired, the control member may be provided with a cut off or cut offs 50 which in the movement of said member to receive a fresh supply of batter from the receptacle, will wipe off whatever batter may have collected at the mouth of the chutes.

In normal operation, assuming the adjusting members in positions shown in Figs. 4 and 5, it will be obvious that by operating the trip the control member may be moved to a position to register the throats 34, 35 and 36 with the respective openings 8 in the bottom of the receptacle so that a predetermined quantity of batter is delivered to each of said throats. The trip member is again operated, and the control member moved in the opposite direction thereby alining the throats 34, 35 and 36 with the batter chutes 5, 6 and 7 and delivering the batter from said throats through the chutes on to the cooking utensil. If, for example, it is desired to cut off one throat or in other words, deliver but two quantities of batter at a single operation, the adjusting member 11, after releasing nut 32 is moved longitudinally of the main member so that the block 26 is positioned beneath that opening 14 immediately adjacent the block 15 of the main member. The throat 34 is thus closed and the throats 35 and 36 only will receive batter in the previously described operation of parts. If it is desired to deliver from a single throat and close two throats the adjusting member 10 is operated to dispose the blocks 21 and 22 directly beneath the adjacent openings 14 of the main member, thereby closing the throats 35 and 36 and delivering batter from a single throat 34 in the operation of the parts previously described. It is of course obvious that any predetermined quantity of batter from and less than that which the full normal throat will contain may be delivered by partially adjusting either member 10 or 11 as may be desired. The adjusting members are of course to be fixed in their adjusted positions as described, following any desired adjustment and the control member operated as a whole.

The locking means described, which as stated locks the control member in a position to register the throats with the chutes and therefore in position to maintain throats out of registry with the openings in the bottom of the receptacle insures against possible leakage from the receptacle under such conditions, and thereby permits use of the receptacle for the particular mixing of the batter ingredients.

The size and proportions of the various parts as well as the material of which they are constructed form no material part of the present invention, as I contemplate the use of any material that would be appropriate and the construction of the parts in any desired size or proportion.

What is claimed is:—

1. A batter dropper including a receptacle formed with discharge openings, chutes arranged below the receptacle out of registry with the respective discharge openings, a control member formed with a receiving chamber and operable to register said receiving chamber with the discharge openings or chutes, said control member including an adjustable section to vary the size of the receiving chambers, and means for locking the adjusting sections in fixed relation to the control member.

2. A batter dropper including a receptacle formed with discharge openings, chutes arranged below the receptacle out of registry with the respective discharge openings, a control member formed with receiving chambers and operable to register said receiving chambers with the discharge openings or chutes, and locking means for the control member including a lever formed with locking lugs, and a projection carried by the control member to coöperate with said lugs.

3. A batter dropper including a receptacle formed with discharge openings, chutes arranged below the receptacle out of registry with the respective discharge openings, a control member formed with receiving chambers and operable to register said receiving chambers with the discharge openings or chutes, locking means for the control member including a lever formed with locking lugs, a projection carried by the control member to coöperate with said lugs, and means for manually adjusting the lever to avoid coöperation with the projections.

4. In a batter dropper, the combination with a receptacle provided with a plurality of discharge openings, a plurality of chutes located below said discharge openings, a control member located between said discharge openings and said chutes for receiving a predetermined quantity of batter from said receptacle through the openings therein and discharging said batter into said chutes, and said controlling member including adjustable blocks for closing communication between the receptacle and said chutes.

5. In a batter dropper, the combination with a receptacle provided with a plurality of discharge openings, a plurality of chutes located below said discharge openings, a control member located between said discharge openings and said chutes for receiving a predetermined quantity of batter from said receptacle through the openings therein and discharging said batter into said chutes, said control member including adjustable blocks for closing communication between the discharge openings of the receptacle and said chutes, and means for retaining and adjusting said blocks in their desired position.

6. In a batter dropper, the combination of a receptacle having a series of discharge openings, a casing detachably connected with the receptacle and arranged therebeneath, a plurality of chutes depending from said casing out of registry with said openings, a controlling member slidably mounted in said casing and formed with a plurality of chambers adapted to register with the discharge openings of the receptacle and said chutes, and adjustable blocks carried by the controlling member for closing communication between the receptacle and said chutes.

In testimony whereof I affix my signature in presence of two witnesses.

JAMES M. SANDERS.

Witnesses:
W. P. LEWIS,
PAUL W. HAHN.

Copies of this patent may be obtained for five cents each, by addressing the "Commissioner of Patents, Washington, D. C."